United States Patent
Nakamura (10) Patent No.: US 10,935,078 B2
(45) Date of Patent: Mar. 2, 2021

(54) MOTOR HAVING A MECHANICAL SEAL FOR HOLDING LUBRICATING OIL SUPPLIED TO A BEARING

(71) Applicant: TOYOTA JIDOSHA KABUSHIKI KAISHA, Toyota (JP)

(72) Inventor: Kiyoharu Nakamura, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/408,778

(22) Filed: May 10, 2019

(65) Prior Publication Data
US 2019/0360531 A1 Nov. 28, 2019

(30) Foreign Application Priority Data
May 25, 2018 (JP) .............................. JP2018-101053

(51) Int. Cl.
*F16C 33/66* (2006.01)
*H02K 5/173* (2006.01)
*H02K 7/08* (2006.01)
*H02K 9/19* (2006.01)

(52) U.S. Cl.
CPC ........ *F16C 33/664* (2013.01); *F16C 33/6659* (2013.01); *H02K 5/1732* (2013.01); *H02K 7/083* (2013.01); *H02K 9/19* (2013.01); *F16C 2380/28* (2013.01)

(58) Field of Classification Search
CPC .. F16C 2380/28; F16C 33/664; F16C 33/659; H02K 5/173; H02K 5/1732; H02K 5/1735; H02K 5/18; H02K 5/52; H02K 7/083; H02K 9/19

USPC ........ 310/54, 64, 89, 90; 384/313, 317, 321, 384/371
See application file for complete search history.

(56) References Cited

U.S. PATENT DOCUMENTS

| | | | |
|---|---|---|---|
| 5,658,127 A * | 8/1997 | Bond | F01D 25/183 277/399 |
| 2008/0093806 A1* | 4/2008 | Takahashi | F16J 15/3404 277/375 |
| 2008/0181546 A1* | 7/2008 | Simon | F01D 3/04 384/123 |
| 2012/0312259 A1* | 12/2012 | Yamanaka | F01L 1/352 123/90.15 |

(Continued)

FOREIGN PATENT DOCUMENTS

| | | |
|---|---|---|
| CN | 102817661 A | 12/2012 |
| JP | 09-032932 A | 2/1997 |
| JP | 2004-072949 A | 3/2004 |

*Primary Examiner* — Tulsidas C Patel
*Assistant Examiner* — Rashad H Johnson
(74) *Attorney, Agent, or Firm* — Sughrue Mion, PLLC (57) ABSTRACT

A motor that ensures efficient supply of a lubricating oil to a mechanical seal and a bearing to reduce temperature rise in driving of a motor is provided. The motor includes a mechanical seal through which a rotary shaft of a rotor is inserted. The mechanical seal includes a seal ring and a mating ring. The seal ring has a sealing surface. The mating ring is secured to the rotary shaft. The mating ring has a sealing surface that contacts the sealing surface of the seal ring. The mating ring has a through hole on an outer edge side of the mating ring with respect to the sealing surface of the mating ring. The lubricating oil flows through the through hole to the bearing side.

3 Claims, 5 Drawing Sheets

(56) References Cited

U.S. PATENT DOCUMENTS

2014/0165938 A1\* 6/2014 Kawada ................... F01L 1/34
                                                        123/90.15
2019/0288576 A1\* 9/2019 Oshita ..................... H02K 7/14

\* cited by examiner

MOTOR HAVING A MECHANICAL SEAL FOR HOLDING LUBRICATING OIL SUPPLIED TO A BEARING

CROSS REFERENCE TO RELATED APPLICATIONS

The present application claims priority from Japanese patent application JP 2018-101053 filed on May 25, 2018, the content of which is hereby incorporated by reference into this application.

BACKGROUND

Technical Field

The present disclosure relates to a motor that includes a mechanical seal at a proximity of a bearing that bears a rotary shaft of a rotor.

Background Art

Conventionally, JP 2004-72949 A discloses a motor that has a mechanical seal structure as this type of motor that includes a mechanical seal. In this motor, in a state where sealing surfaces of a mating ring and a seal ring of the mechanical seal hold lubricating oil, they are sealed, and the lubricating oil is supplied to the bearing.

SUMMARY

Now, in the motor that has the mechanical seal structure as disclosed in JP 2004-72949 A, a configuration where the lubricating oil is supplied to the bearing from between an outer peripheral surface of the mating ring and the motor housing is often employed. In this case, while a heat generated in a rotor is radiated to the lubricating oil from the mating ring, it is difficult to effectively radiate the heat of the rotor with the mating ring because a surface area of the mating ring is not sufficiently ensured. Increasing a diameter of the mating ring to improve heat radiation efficiency of the mating ring can increase heat radiation area of the mating ring. However, since a cross section of a flow passage of the lubricating oil between the outer peripheral surface of the mating ring and the motor housing decreases, it is difficult to stably ensure the supply of the lubricating oil flowing to the bearing.

The present disclosure has been made in view of the above-described problems, and the present disclosure provides a motor that stably ensures supply of lubricating oil to a bearing that rotatably supports a rotary shaft of a rotor and ensures reduction of temperature rise in driving of the motor.

In view of the above-described problems, the motor according to the present disclosure includes a motor housing, a bearing, and a mechanical seal. The motor housing internally includes a rotor and a stator. The bearing rotatably supports a rotary shaft of the rotor to the motor housing. The mechanical seal is arranged on an end portion side of the rotary shaft with respect to the bearing. The mechanical seal seals a lubricating oil in the motor housing. The lubricating oil is supplied to the bearing. The rotary shaft of the rotor is inserted through the mechanical seal. The mechanical seal includes a seal ring and a mating ring. The seal ring has a sealing surface. The mating ring is secured to the rotary shaft in a state where the rotary shaft is inserted through the mating ring. The mating ring has a sealing surface that contacts the sealing surface of the seal ring. The mating ring includes a lubricating oil passage on an outer edge side of the mating ring with respect to the sealing surface of the mating ring. The lubricating oil flows through the lubricating oil passage to the bearing side.

With the present disclosure, the heat generated in driving of the motor is transmitted to the rotary shaft of the rotor, and the transmitted heat is further transmitted to the mating ring secured to the rotary shaft. Frictional heat of the mating ring and the seal ring is also applied, thus increasing temperature of the mating ring. At this time, since the lubricating oil supplied to the bearing flows to the bearing via the lubricating oil passage formed on an outer edge side with respect to the sealing surface of the mating ring, the heat transmitted to the mating ring can be absorbed by the lubricating oil. Consequently, the temperature rise of the motor including the mating ring can be reduced, thus ensuring stable supply of the lubricating oil to the bearing.

Here, the lubricating oil passage may be a cutout, a through hole, or the like formed on a peripheral edge portion of the mating ring, and is not specifically limited insofar as the lubricating oil can pass through to the bearing side. However, in some embodiments, the lubricating oil passage is a through hole formed in the mating ring.

With this aspect, forming the through hole as the lubricating oil passage ensures efficient heat radiation of the mating ring with an outer surface of the mating ring and a wall surface of the through hole. Compared with the case of the cutout, the through hole having the wall surface widened in heat radiation area is disposed on a position close to the rotary shaft inserted through the mating ring. Accordingly, the heat transmitted to the mating ring can be more efficiently absorbed by the lubricating oil.

Furthermore, while the shape of the mating ring is not especially specified, in some embodiments, the mating ring has an outer peripheral surface on which a plurality of fins are formed extending along a circumferential direction.

With this aspect, forming the plurality of fins on the outer peripheral surface of the mating ring along the circumferential direction ensures the increased surface area of the mating ring, thus ensuring the efficient heat radiation of the fins. Consequently, the heat exchange efficiency with the lubricating oil improves to ensure the reduced temperature rise of the mating ring, thus ensuring the reduction of the temperature rise in the driving of the motor as a result.

The present disclosure stably ensures the supply of the lubricating oil to the bearing that supports the rotary shaft of the rotor with the through hole in the mating ring and radiates the heat generated in the driving of the motor from the mating ring to the lubricating oil, thus ensuring the reduced temperature rise of the motor.

DETAILED DESCRIPTION

Figure 1:
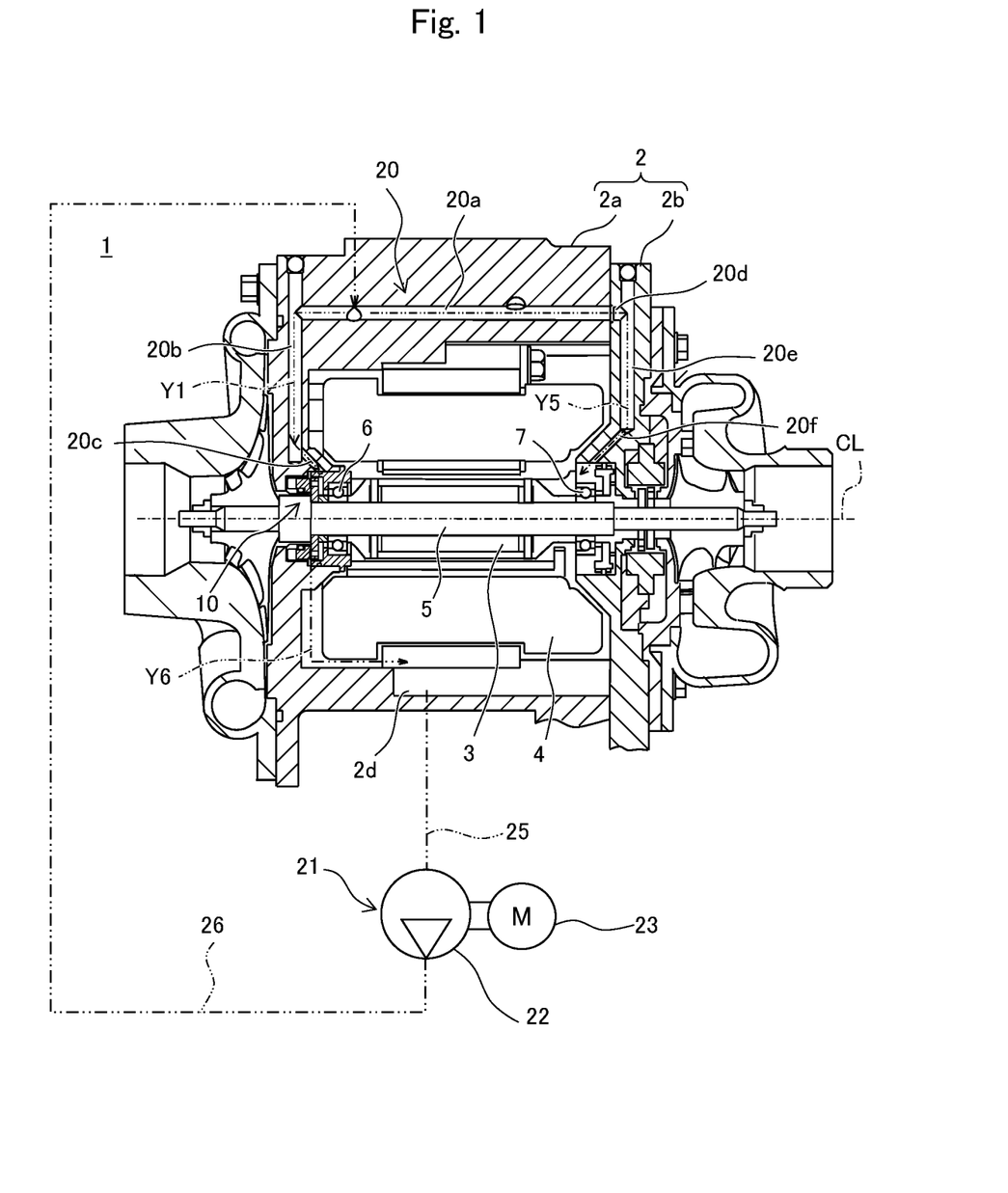
FIG. 1 is a cross-sectional view illustrating one embodiment of a motor according to an embodiment of the disclosure.
Figure 2A:
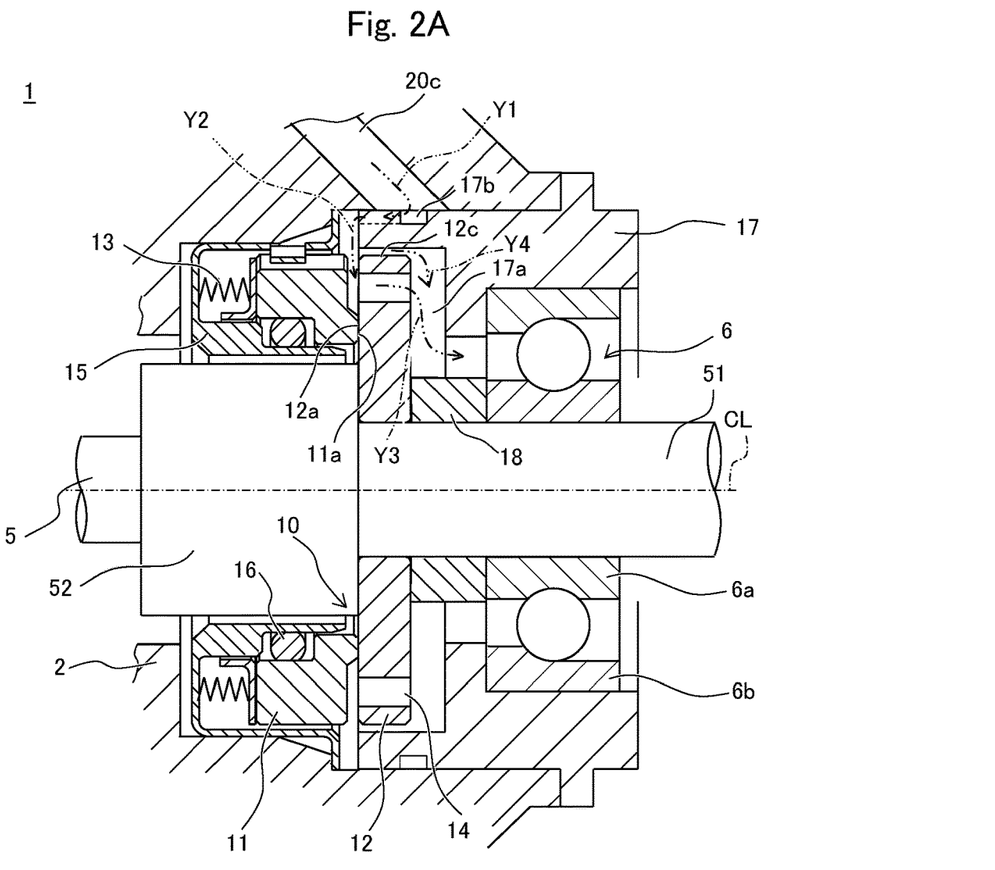
FIG. 2A is a main part cross-sectional view illustrating the mechanical seal portion of FIG. 1.
Figure 2B:
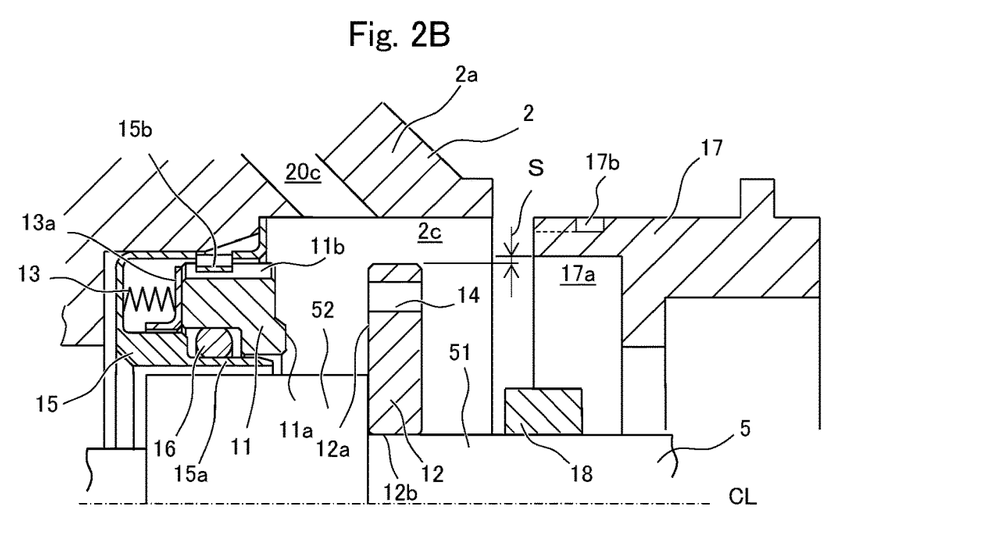
FIG. 2B is a main part cross-sectional view illustrating the mechanical seal of FIG. 2A in the exploded state.
Figure 3A:
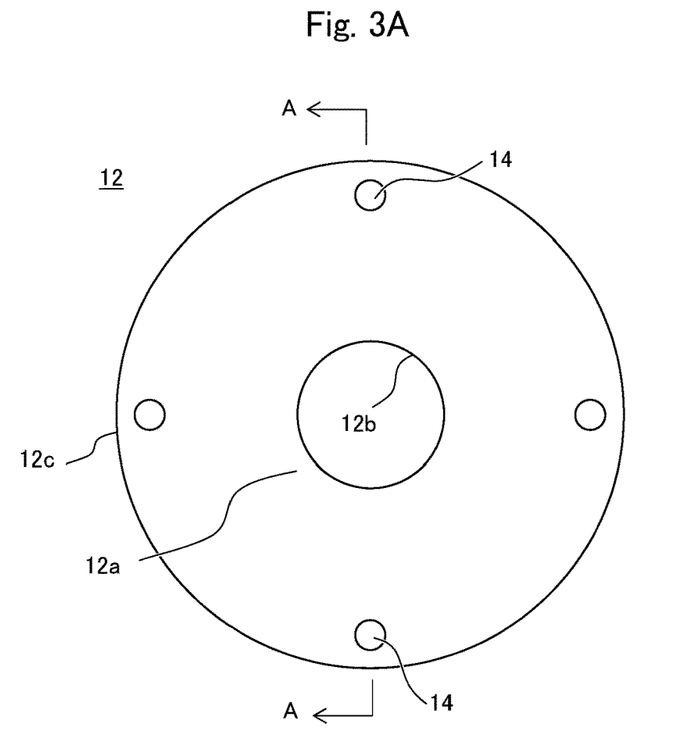
FIG. 3A is a front view of a mating ring of the mechanical seal of FIG. 2A.
Figure 3B:
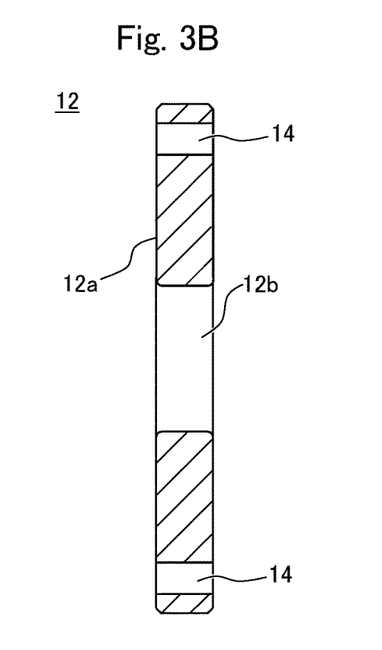
FIG. 3B is a cross-sectional view of the mating ring taken along the line A-A of FIG. 3A viewed in the arrow direction.

The following describes one embodiment of a motor according to embodiments of the present disclosure based on the drawings in detail. FIG. 1 is a cross-sectional view of the motor according to this embodiment. FIG. 2A is a main part cross-sectional view illustrating a mechanical seal portion of FIG. 1. FIG. 2B is a main part cross-sectional view illustrating the mechanical seal of FIG. 2A in the exploded state. FIG. 3A is a front view of a mating ring of the mechanical seal of FIG. 2A. FIG. 3B is a cross-sectional view of the mating ring taken along the line A-A of FIG. 3A viewed in the arrow direction.

A motor 1 of this embodiment includes a rotor 3 and a stator 4 in a motor housing 2. The motor housing 2 constitutes a chassis of the motor 1 and houses the rotor 3 and the stator 4. The motor housing 2 includes a main body portion 2a that houses the rotor 3, the stator 4, and the like, and a lid body 2b that covers an opening of the main body portion 2a.

The rotor 3 is secured to an outer periphery of a rotary shaft 5. The rotary shaft 5 is rotatably supported to the motor housing 2 via bearings 6 and 7. For the bearings 6 and 7, rolling bearings such as ball bearings are used. The stator 4 is secured inside the motor housing 2 along its inner wall. The rotor 3 is a rotor of, for example, a permanent magnet type, and the stator 4 includes, for example, a yoke and a coil.

The motor 1 includes a mechanical seal 10 arranged on an end portion side of the rotary shaft 5 with respect to the bearing 6. In this embodiment, the mechanical seal 10 is arranged close to the bearing 6. The mechanical seal may be disposed also for the bearing 7. The mechanical seal 10 has a function to seal lubricating oil supplied to the bearing 6 in the motor housing 2. That is, the mechanical seal 10 restricts the lubricating oil from leaking outside from the motor housing 2 from a lubrication space where the lubricating oil is supplied to the bearings 6 and 7.

Specifically, as illustrated in FIG. 2B, the mechanical seal 10 basically includes a seal ring 11, a mating ring 12, and a spring 13 that urges the seal ring 11 to the mating ring 12.

The rotary shaft 5 of the rotor 3 is inserted through the seal ring 11, and the seal ring 11 has a sealing surface 11a. The seal ring 11 is movable along the rotary shaft 5. The mating ring 12 is secured to the rotary shaft 5 in a state where the rotary shaft 5 is inserted through the mating ring 12. The mating ring 12 has a sealing surface 12a that contacts the sealing surface 11a of the seal ring 11 via the lubricating oil. The spring 13 urges the seal ring 11 to the mating ring 12, thus pressing the sealing surface 11a of the seal ring 11 onto the sealing surface 12a of the mating ring 12.

The sealing surface 11a of the seal ring 11 is a flat surface extending in a direction perpendicular to the central axis of the rotary shaft 5, and also the sealing surface 12a of the mating ring 12 is a flat surface extending in the direction perpendicular to the central axis of the rotary shaft 5. Thus, both sealing surfaces 11a and 12a are flat surfaces to be mutually in close contact.

The mating ring 12 rotates with the rotary shaft 5, the seal ring 11 is attached to the motor housing 2, and the spring 13 urges the seal ring 11 toward the mating ring 12. An oil film of the lubricating oil is formed between the sealing surface 11a of the seal ring 11 and the sealing surface 12a of the mating ring 12.

This restricts the seal ring 11 from rotating with the mating ring 12, but causes the seal ring 11 to slide while being in close contact with the mating ring 12 via the oil film of the lubricating oil formed between the sealing surfaces 11a and 12a. Accordingly, the lubricating oil is sealed by the sealing surfaces 11a and 12a of the seal ring 11 and the mating ring 12.

The seal ring 11 is attached to the motor housing 2 in a state of being housed in a case 15 in an attaching recess 2c formed with the motor housing 2 and the rotary shaft 5. Specifically, the spring 13 and the seal ring 11 are inserted into the case 15 from an opening, and the spring 13 urges the seal ring 11 in the direction of the mating ring 12.

In this embodiment, an O-ring 16 having a circular cross section is interposed between a thin walled tubular portion 15a, which extends in an opening direction of the case 15, and a stepped part of the seal ring 11. This O-ring 16 forms a seal between the case 15 and the seal ring 11, thus ensures restricting the lubricating oil inside the case 15 from leaking outside from the motor housing 2.

The case 15 includes a protrusion 15b projecting inward from an outer peripheral surface, and the protrusion 15b enters a recessed portion 11b formed on an outer periphery of the seal ring 11. The protrusion 15b and the recessed portion 11b can restrict the seal ring 11 from rotating with respect to the case 15, and restrict an amount of movement of the seal ring 11 in a rotary-shaft direction.

This ensures restricting the seal ring 11 from rotating in the case 15 with the rotary shaft 5, and restricting the seal ring 11 from falling out of the case 15 due to the spring 13 with the protrusion 15b abutting on a step 13a of the spring 13 even if the sealing surface 11a is pushed onto the sealing surface 12a of the mating ring 12. A plurality of the protrusions 15b and a plurality of the recessed portions 11b may be respectively formed on the case 15 and the seal ring 11 along their outer peripheral surfaces.

The mating ring 12 is formed of a metallic circular plate. The mating ring 12 has a center hole 12b, which is fitted onto a small-diameter portion 51 of the rotary shaft 5 by press fitting. The mating ring 12 abuts on a step between the small-diameter portion 51 and a large-diameter portion 52 of the rotary shaft 5. The mating ring 12 includes the sealing surface 12a that is brought in contact with the sealing surface 11a of the seal ring 11, and both sealing surfaces 11a and 12a are formed in flat smooth surfaces.

The mating ring 12 has through holes 14 on an outer edge side of the mating ring 12 with respect to the sealing surface 12a of the mating ring 12, and the lubricating oil flows through the through holes 14 to the bearing 6 side. More specifically, in this embodiment, the through holes 14 are formed on the outer edge side of the mating ring 12 with respect to the sealing surface 11a of the seal ring 11 such that the sealing surface 11a of the seal ring 11 does not cover a part of the through hole 14. In this embodiment, the through holes 14 are lubricating oil passages through which the lubricating oil flows from the sealing surface 12a side of the mating ring 12 to the bearing 6 side. In this embodiment, the four through holes 14 are formed on a circumference around the rotary shaft 5 at regular intervals of 90°. The mating ring 12 is not limited to be made of metal but may be a ceramic circular plate and the like. The number of through holes is not limited to four.

For the above-described bearing 6, an angular contact ball bearing is employed in this embodiment. As illustrated in FIG. 2A, an inner race 6a is secured to the rotary shaft 5 by press fitting, and an outer race 6b is secured to the attaching recess 2c formed on the main body portion 2a of the motor housing 2 via a receiving member 17 and a spacer ring 18. In a state where these members are secured, a part of an oil passage 20 (see FIG. 1), in which the lubricating oil flows, is formed in a space formed in the attaching recess 2c.

Here, the spacer ring 18 keeps a distance between the inner race 6a of the bearing 6 and the mating ring 12 constant. The mating ring 12 is arranged so as to be positioned inside a recessed portion 17a of the receiving member 17, and configured such that a space S (see FIG. 2B) is generated inside the recessed portion 17a. Forming such a space S ensures the lubricating oil to flow using this space S as a part of the oil passage 20.

The motor 1 includes the oil passage 20 that supplies the lubricating oil to the bearings 6 and 7 as described above. As illustrated in FIG. 1, the main body portion 2a of the motor housing 2 includes a first oil passage 20a as a part of the oil passage 20 in a direction along the central axis CL. Furthermore, for the bearing 6, a second oil passage 20b communicated with the first oil passage 20a and a third oil passage 20c, which extends from an end of the second oil passage 20b in a direction toward the bearing 6 and has a narrow diameter, are formed. For the bearing 7, a fourth oil passage 20d is formed along a thickness direction of the lid body 2b so as to be communicated with the first oil passage 20a, and a fifth oil passage 20e communicated with the fourth oil passage 20d and a sixth oil passage 20f, which extends from the fifth oil passage 20e in a direction toward the bearing 7 and has a narrow diameter, are formed.

As illustrated in FIG. 2A and the like, the third oil passage 20c for the bearing 6 communicates with a supply passage 17b formed on the receiving member 17 that secures the bearing 6, and the supply passage 17b opens in an end surface of the receiving member 17. The end surface of the receiving member 17 is positioned on the outer peripheral side with respect to a contact surface of the sealing surface 12a of the mating ring 12 and the sealing surface 11a of the seal ring 11, and an oil passage is formed such that the lubricating oil flowing out of the supply passage 17b is supplied to the sealing surface 12a side of the mating ring 12. As illustrated in FIG. 1, an oil passage is formed such that the lubricating oil flowing out of the sixth oil passage 20f for the bearing 7 is supplied to the bearing 7.

To supply the lubricating oil to the above-described bearings 6 and 7, a circulation device 21, which sends the lubricating oil to the oil passage 20, includes a circulation pump 22 and a circulation motor 23 as illustrated in FIG. 1. The motor housing 2 includes an oil pan 2d on a lower portion of the main body portion 2a. The lubricating oil supplied to the bearings 6 and 7 drop and is accumulated in the oil pan 2d. In addition, the circulation device 21 includes a pipe 25 to send the lubricating oil accumulated in the oil pan 2d to the circulation pump 22, and a pipe 26 to send the lubricating oil from the circulation pump 22 to the first oil passage 20a of the motor housing 2.

The following describes the effects of the above configured motor 1 of this embodiment. When the motor 1 is driven, the circulation device 21 of the lubricating oil is operated at first. This causes the lubricating oil to be forcibly supplied to the bearings 6 and 7. Specifically, the lubricating oil accumulated in the oil pan 2d of the motor housing 2 is delivered by the circulation pump 22 driven by the circulation motor 23 via the pipes 25 and 26, and injected to the first oil passage 20a from an injection port disposed on an upper portion of the motor housing 2. The injected lubricating oil passes through the first oil passage 20a, the second oil passage 20b, and the third oil passage 20c in this order (see the arrow Y1 of FIG. 1), and is discharged from the opening of the supply passage 17b of the receiving member 17 (see the arrow Y2 of FIG. 2A).

A part of the lubricating oil is supplied to the contact surface of the sealing surface 11a of the seal ring 11 and the sealing surface 12a of the mating ring 12, thus forming the oil film between the sealing surface 11a and the sealing surface 12a. Furthermore, the lubricating oil is supplied to the bearing 6 passing through the through holes 14 of the mating ring 12 (see the arrow Y3 of FIG. 2A), while the lubricating oil is supplied to the bearing 6 passing through an outer peripheral surface 12c of the mating ring 12 (see the arrow Y4 of FIG. 2A).

Meanwhile, the lubricating oil flows from the first oil passage 20a to the fourth oil passage 20d communicated with the first oil passage 20a, and furthermore, the lubricating oil is supplied to the bearing 7 passing through the fifth oil passage 20e and the sixth oil passage 20f in this order (see the arrow Y5 of FIG. 1). The lubricating oil supplied to the bearing 6 flows as indicated by the arrow Y6 of FIG. 1, and is accumulated in the oil pan 2d. The lubricating oil supplied to the bearing 7 similarly drops and is accumulated in the oil pan 2d, while the illustration is omitted. The accumulated lubricating oil is delivered by the circulation device 21. Thus, the circulation passage of the lubricating oil is formed.

After that, by energizing the motor 1 to rotate the rotor 3 of the motor 1, the mating ring 12 secured to the rotary shaft 5 integrally rotates. At this time, since the seal ring 11 does not rotate with the rotary shaft 5, the oil film of the lubricating oil is formed on the whole circumference of the sealing surface 11a and the sealing surface 12a with the lubricating oil supplied to the contact surface of the sealing surface 12a of the mating ring 12 and the sealing surface 11a of the seal ring 11.

Thus, supplying the lubricating oil to the mechanical seal 10 forms the oil film between the sealing surface 11a of the seal ring 11 and the sealing surface 12a of the mating ring 12, thus ensuring reduction of abrasion between the sealing surfaces 11a and 12a and ensuring smooth slide. A noise generated by sliding the sealing surfaces 11a and 12a can be reduced. Since both the sealing surfaces 11a and 12a are covered with the oil film of the lubricating oil, sealing performance becomes stable, thus ensuring restricting the lubricating oil from leaking outside from the motor housing 2.

Furthermore, the heat generated in driving of the motor 1 is transmitted to the rotary shaft 5 of the rotor 3, and the transmitted heat is further transmitted to the mating ring 12 secured to the rotary shaft 5. Frictional heat of the mating ring 12 and the seal ring 11 is also applied, thus increasing temperature of the mating ring.

At this time, the lubricating oil supplied to the bearing 6 flows to the bearing 6 passing through the through holes 14 formed on the outer edge side of the mating ring 12, while flowing to the bearing 6 passing through the outer peripheral surface 12c of the mating ring 12, thus ensuring absorbing the heat transmitted to the mating ring 12 by the lubricating oil. Consequently, the temperature rise of the motor 1 including the mating ring 12 can be reduced while ensuring stable supply of the lubricating oil to the bearing 6. Accordingly, the degradation of magnetic properties of the motor 1 can be suppressed. Especially, when a permanent magnet is used for the rotor 3, demagnetization of the permanent magnet due to the temperature rise can be suppressed.

Furthermore, for the lubricating oil passage as the oil passage 20, for example, a cutout may be provided on a peripheral edge portion of the mating ring 12 instead of the through hole 14. However, like this embodiment, providing the through hole 14 ensures widened heat radiation area on the mating ring 12 compared with the case of the cutout. Furthermore, compared with the case of the cutout, the through hole 14 having a wall surface widened in heat radiation area can be provided on a position close to the rotary shaft 5 inserted through the mating ring 12. Accordingly, the heat transmitted to the mating ring 12 can be more efficiently absorbed by the lubricating oil.

Figure 4:
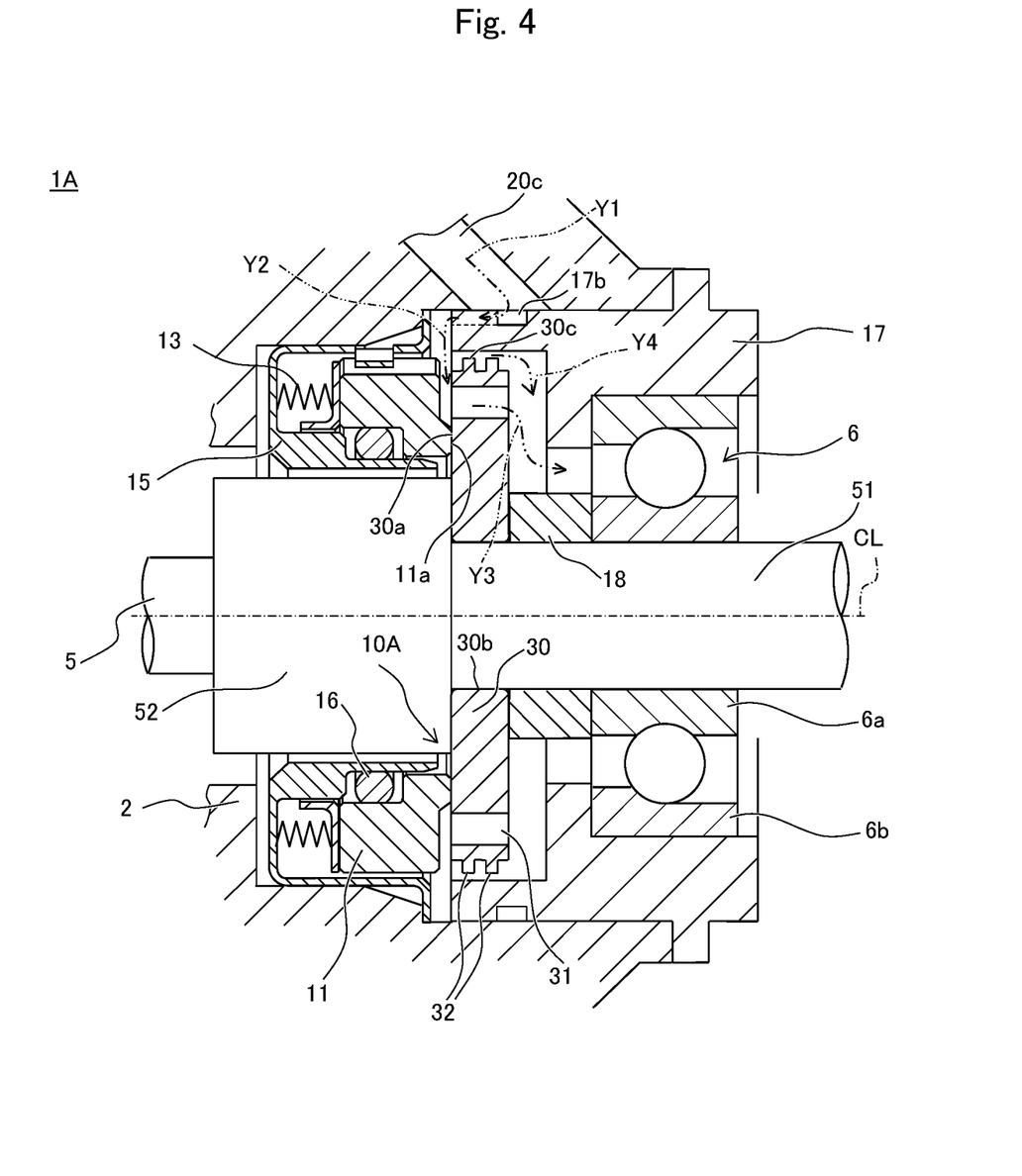
FIG. 4 is a cross-sectional view illustrating a mechanical seal portion of another embodiment of the motor according to the disclosure.
Figure 5A:
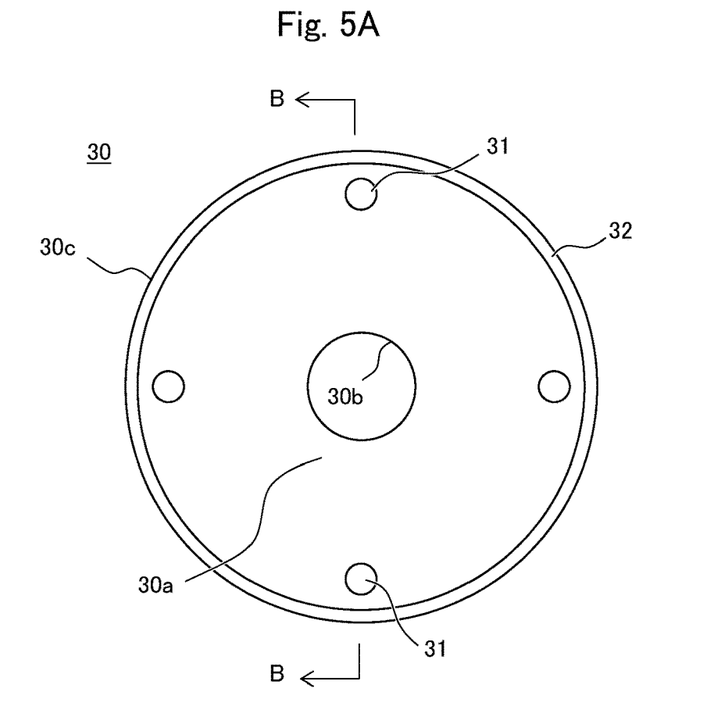
FIG. 5A is a front view of a mating ring of the mechanical seal of FIG. 4.
Figure 5B:
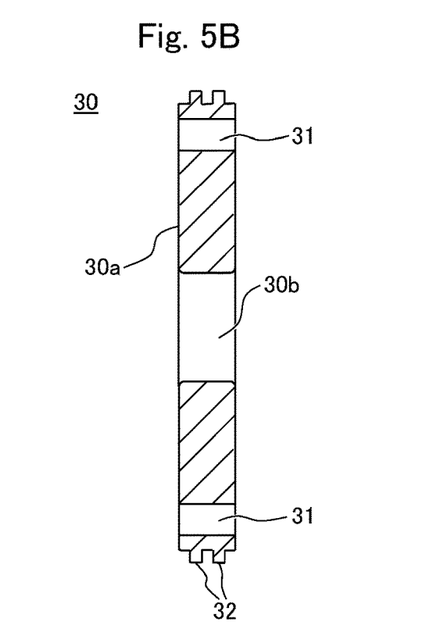
FIG. 5B is a cross-sectional view of the mating ring taken along the line B-B of FIG. 5A viewed in the arrow direction.

Next, another embodiment of the motor according to the present disclosure will be described in detail based on FIG. 4, FIG. 5A, and FIG. 5B. FIG. 4 is a main part cross-sectional view illustrating a mechanical seal portion of the other embodiment of the motor according to the disclosure. FIG. 5A is a front view of a mating ring of the mechanical seal of FIG. 4. FIG. 5B is a cross-sectional view of the mating ring taken along the line B-B of FIG. 5A viewed in the arrow direction. This embodiment is different from the above-described embodiment in that the mating ring has a different shape and the mating ring includes fins on its outer peripheral surface. Like reference numerals designate other substantially equivalent components and detailed descriptions will be omitted.

In a motor 1A of this embodiment, a mating ring 30 of a mechanical seal 10A is made of a metallic circular plate, and has a sealing surface 30a that extends in a direction perpendicular to the central axis CL of the rotary shaft 5. The mating ring 30 has a center hole 30b, which is fitted onto the small-diameter portion 51 of the rotary shaft 5 by press fitting, and the mating ring 30 abuts on a step between the small-diameter portion 51 and the large-diameter portion 52 of the rotary shaft 5. The sealing surface 30a of the mating ring 30 is brought in contact with the sealing surface 11a of the seal ring 11, and the lubricating oil is supplied to both sealing surfaces 30a and 11a to form the oil film, thus forming a dynamic seal.

The mating ring 30 has through holes 31 on an outer edge side of the mating ring 30 with respect to the sealing surface 30a of the mating ring 30, and the lubricating oil flows through the through holes 31 to the bearing side. Also in this embodiment, the four through holes 31 are formed on a circumference around the rotary shaft 5 at regular intervals. The mating ring 30 has an outer peripheral surface 30c where a plurality of fins 32 are formed extending along the circumferential direction. In this embodiment, the two fins 32 are formed projecting in parallel. The fin 32 has a cross section in a rectangular shape.

In this embodiment, the mating ring 30 has the plurality of fins 32 on the outer edge. This ensures the increased surface area of the mating ring 30 and ensures the lubricating oil to enter a groove formed over the whole circumference along the fins 32, thus improving the heat radiation performance. Accordingly, the frictional heat caused by the contact of the seal ring 11 and the mating ring 30 can be more efficiently radiated to reduce the temperature rise of the motor 1A.

The fin formed on the outer edge of the mating ring 30 does not necessarily have the above-described rectangular cross section, but may have the cross section in an appropriate shape such as a semicircular shape, a mountain shape, and a trapezoidal shape. Insofar as the surface area of the outer edge of the mating ring increases, any shape is employable. The number of fins is not limited to two, but three or more fins may be formed.

While the embodiments of the present disclosure have been described in detail above, the present disclosure is not limited thereto, and can be subjected to various kinds of changes in design without departing from the spirit and scope of the present disclosure described in the claims.

While this embodiment exemplifies the case where four through holes are formed on the outer edge side of the mating ring at regular intervals on the circumference, increasing the number of through holes increases the supply of the lubricating oil to the bearing, thus ensuring further suppressing the temperature rise of the motor by the lubricating oil flowing through the through holes.

Furthermore, in this embodiment, the plurality of through holes, through which the lubricating oil flow to the bearing side, are provided on the outer edge side of the mating ring with respect to the sealing surface of the mating ring. However, for example, as described above, a plurality of cutouts, which are formed by partially cutting out the outer edge of the mating ring, may be provided on the outer edge side of the mating ring with respect to the sealing surface of the mating ring so as to flow the lubricating oil to the bearing side.

INDUSTRIAL APPLICABILITY

As an application example of the present disclosure, the use of the motor of the embodiment is employable in various devices, and the installation of the motor of the embodiment is applicable to use of a compressor and various devices having pump motors as driving sources. Especially, since the compressor compresses a fluid with large heat generation of the apparatus itself, the motor of the embodiment that can reduce the temperature rise is effectively applicable to the compressor.

What is claimed is:

1. A motor comprising:
a motor housing that internally includes a rotor and a stator;
a bearing that rotatably supports a rotary shaft of the rotor to the motor housing;
a mechanical seal arranged on an end portion side of the rotary shaft with respect to the bearing, the mechanical seal sealing a lubricating oil in the motor housing, the lubricating oil being supplied to the bearing,
wherein the rotary shaft of the rotor is inserted through the mechanical seal, the mechanical seal includes a seal ring and a mating ring, the seal ring has a sealing surface, the mating ring is secured to the rotary shaft in a state where the rotary shaft is inserted through the mating ring, the mating ring has a sealing surface that contacts the sealing surface of the seal ring; and
a spacer ring provided between the bearing and the mechanical seal, so that the bearing is arranged at a position opposite to the mechanical seal with respect to the spacer ring,
wherein the mating ring has a contact surface that contacts the spacer ring, and
the mating ring includes a lubricating oil passage formed at a position that is radially outward from the sealing surface of the mating ring and the contact surface of the mating ring, the lubricating oil flows through the lubricating oil passage from a mechanical seal side to a bearing side of the mating ring.

2. The motor according to claim 1,
wherein the lubricating oil passage is a through hole formed in the mating ring.

3. The motor according to claim 1,
wherein the mating ring has an outer peripheral surface on which a plurality of fins are formed extending along a circumferential direction.

* * * * *